(12) United States Patent
Ishitoya et al.

(10) Patent No.: US 8,770,221 B2
(45) Date of Patent: Jul. 8, 2014

(54) PRESSURE REGULATING VALVE

(75) Inventors: Tsukuo Ishitoya, Toyota (JP); Nobuo Kobayashi, Toyota (JP); Nobuyuki Ogami, Anjo (JP); Akira Yamashita, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/618,954

(22) Filed: Sep. 14, 2012

(65) Prior Publication Data

US 2013/0008530 A1    Jan. 10, 2013

Related U.S. Application Data

(62) Division of application No. 13/137,582, filed on Aug. 26, 2011, which is a division of application No. 11/791,223, filed as application No. PCT/JP2005/021192 on Nov. 14, 2005, now abandoned.

(30) Foreign Application Priority Data

Dec. 15, 2004 (JP) ................................. 2004-363435

(51) Int. Cl.
    *G05D 16/10* (2006.01)

(52) U.S. Cl.
    USPC .................. 137/505.41; 137/505.42; 251/64; 92/86.5; 92/162 R; 92/163

(58) Field of Classification Search
    CPC .............. G05D 16/103; G05D 16/106; F16K 31/1221; F16K 31/1223; F16K 31/363; F16J 9/26; F16J 9/28
    USPC .................. 137/505, 505.42, 505.41; 251/64; 92/86.5, 163, 164, 162 R, 162 PR, 162 P
    See application file for complete search history.

(56) References Cited

U.S. PATENT DOCUMENTS 2,278,395 A * 3/1942 Lichte et al. .................. 417/493
3,155,015 A   11/1964 Genz
(Continued)

FOREIGN PATENT DOCUMENTS

CN          Y-2169741           6/1994
DE     20 2004 001 877 U1       5/2004
(Continued)

OTHER PUBLICATIONS

Aug. 27, 2013 Office Action issued in U.S. Appl. No. 13/137,582.
(Continued)

*Primary Examiner* — William McCalister
(74) *Attorney, Agent, or Firm* — Oliff PLC

(57) ABSTRACT

In order to achieve seal durability and bring about a damping action for a piston-type pressure regulating valve, a pressure regulating valve of the present invention is characterized by a valve moving member moving in such a manner as to cause communication or block communication between a primary chamber and a secondary chamber within a case, wherein a plurality of central members are arranged between the case and the valve moving member and the plurality of central members are taken to be different materials. It is then possible to bring about both a damping action and seal durability using the central members by providing central members of different materials.

14 Claims, 13 Drawing Sheets

(56) References Cited

U.S. PATENT DOCUMENTS

| | | | |
|---|---|---|---|
| 3,324,873 A * | 6/1967 | Trombatore et al. | 137/116.3 |
| 3,930,657 A | 1/1976 | Svensson et al. | |
| 4,241,644 A * | 12/1980 | Schertler | 91/447 |
| 4,276,902 A | 7/1981 | Roth | |
| 4,424,738 A | 1/1984 | Leighton | |
| 4,458,718 A | 7/1984 | Vick | |
| 5,033,505 A | 7/1991 | Eidsmore | |
| 5,217,245 A | 6/1993 | Guy | |
| 5,234,026 A | 8/1993 | Patterson | |
| 5,348,039 A | 9/1994 | Taylor et al. | |
| 5,452,741 A | 9/1995 | Tomita et al. | |
| 6,578,601 B2 | 6/2003 | Giordano | |
| 7,192,665 B2 | 3/2007 | Nakajima et al. | |
| 2003/0080219 A1 | 5/2003 | Dankert | |

FOREIGN PATENT DOCUMENTS

| | | |
|---|---|---|
| EP | 0 403 144 A2 | 12/1990 |
| EP | 0 509 323 A2 | 10/1992 |
| EP | 0 565 292 A1 | 10/1993 |
| EP | 1 357 322 A1 | 10/2003 |
| JP | U-63-68584 | 5/1988 |
| JP | U-01-178285 | 12/1989 |
| JP | A-03-219174 | 9/1991 |
| JP | U-7-25402 | 5/1995 |
| JP | A-07-234725 | 9/1995 |
| JP | A-10-306879 | 11/1998 |
| JP | A-2000-179722 | 6/2000 |
| JP | A-2002-157021 | 5/2002 |
| JP | A-2004-185872 | 7/2004 |

OTHER PUBLICATIONS

Office Action issued Oct. 12, 2012 in U.S. Appl. No. 13/137,582.
May 10, 2013 Office Action issued in U.S. Appl. No. 13/137,582.
Jul. 30, 2013 Office Action issued in U.S. Appl. No. 13/137,582.
Feb. 6, 2014 Office Action issued in U.S. Appl. 13/137,582.

* cited by examiner (A)  (B)

(A)

(B)

(A)

(B)

PRESSURE REGULATING VALVE

CROSS-REFERENCE TO RELATED APPLICATIONS

This application is a divisional of U.S. patent application Ser. No. 13/137,582 filed on Aug. 26, 2011, which is a divisional of U.S. patent application Ser. No. 11/791,223 filed on May 22, 2007, which is a National Phase of Application No. PCT/JP2005/021192 filed Nov. 14, 2005 and claims priority to Japanese Patent Application No. JP 2004-363435 filed Dec. 15, 2004, the disclosures of which are incorporated herein by reference in their entireties.

TECHNICAL FIELD

The present invention relates to a pressure regulating valve for regulating fluid pressure.

BACKGROUND ART

Pressure regulating valves such as disclosed in, for example, Japanese Utility Model Laid-open Publication No. Hei. 1-178285, exist as pressure regulating valves for reducing pressure of gases. Such pressure-reducing valves are configured from a pressure regulating spring, a piston moving within a cylinder, a valve element, and a return spring etc. Between the piston and cylinder is then sealed using a U-shaped seal.

DISCLOSURE OF THE INVENTION

However, there is the problem that rubber seals that are typically used as seals have low durability. Further, when hard resin seal material of high durability is used, it is not possible to obtain a sufficient damping action (attenuating action) with respect to movement (vibration or oscillation, over shoot) of the valve using the rubber seal material and fluctuations in the secondary pressure of the pressure regulating valve are therefore large.

It is therefore the object of the present invention to provide a pressure regulating valve capable of providing both durability for a seal material between a valve member (piston) and a case (cylinder) for the valve member and of providing a damping action for suppressing vibration of the valve element and for suppressing overheating.

In order to achieve the aforementioned object, a pressure regulating valve of the present invention is characterized by a valve moving member moving in such a manner as to cause communication or block communication between a primary chamber and a secondary chamber within a case, wherein a plurality of central members are arranged between the case and the valve moving member and the plurality of central members are taken to be different materials.

By providing central members of different materials, it is possible to bring about both a damping action and seal durability.

It is also preferable for materials for the plurality of central members to be selected so as to have different resistances to sliding.

By providing central members of different resistances to sliding, it is possible to bring about both a damping action and seal durability. A central member with a large resistance to sliding (for example, rubber seal material) has a damping action (attenuating action) with respect to vibration of the piston and overshooting. A hard central member (for example, a Teflon group resin etc.) of small resistance to sliding has high durability.

It is also preferable for the plurality of central members to be constituted by a seal member provided at least between a side surface of the valve moving member and an inner wall of the case and a damping member for attenuating an extent of movement of the valve moving member.

According to this configuration, the damping member has a function for attenuating moving energy (kinetic energy) using frictional force during movement of the piston and suppresses vibration and overshooting at the time of movement of the piston. As a result, it is possible to make gas pressure fluctuation on the downstream side (secondary side) of the pressure regulating valve small.

It is also desirable for the valve moving member to include a piston and a valve element, and for the seal member and the damping member to be arranged between a side surface of the piston and the inner wall of the case.

It is also preferable for the valve moving member to include a piston and a valve element, with one end of the piston coming into contact with the secondary chamber and the other end coming into contact with the reference pressure chamber, and with the plurality of central members being located between a side surface of the piston and the inner wall of the case.

It is also desirable for the central member positioned at the secondary chamber-side of the piston to have a lower resistance to sliding than the central member on the side of the reference pressure chamber.

It is further desirable for the central member positioned at the secondary chamber-side of the piston to seal fluids more effectively than the central member on the side of the reference pressure chamber.

It is also preferable for the central member positioned on the side of the reference pressure chamber of the piston to attenuate moving force of the valve moving member to a lesser extent than the central member on the side of the secondary chamber.

It is also desirable for the plurality of central members to be constituted by at least two seal members for sealing fluid, with one seal member having a relatively higher resistance to sliding than the other seal member.

There may also be provided communicating means for causing a space defined by the side surface of the piston, the inner wall of the case and the plurality of central members and the reference pressure chamber to communicate.

By providing communicating means, the space and the reference pressure chamber are made to communicate, and it is possible to regulate the pressure value of the space at the time of moving the piston. Further, the communicating means may also be utilized in checking a sealed state of a central member during manufacture or when valve abnormalities are detected.

The communicating means may be formed at at least one of the piston or the inner wall of the case.

The communicating means may be formed at a central member located at the reference pressure chamber side or at a contact surface of an inner wall of the case and a central member.

One of the plurality of central members may be a damping member with a function for highly attenuating an extent of movement of the valve moving member, with the damping member being located at at least one of between the inner wall of the case and the valve element and between the inner wall of the case and the piston.

It is also preferable for the valve moving member to include a valve element and a piston and be arranged with first and second urging members on either side within the case, and for the damping member to be located at at least one of between the case and the first urging means, between the first urging means and the valve element, between the valve element and the piston, between the piston and the second urging means, and between the second urging means and the case.

The pressure regulating valve of the present invention is suited to regulating the pressure of high-pressure gas and of fuel gas such as hydrogenous gas.

The fuel gas supply system of the present invention comprises a fuel gas supply source and the pressure regulating valve according to the present invention.

Preferably, the fuel gas supply system comprises a fuel gas container or a fuel gas consuming member, which is connected to the primary chamber of the pressure regulating valve. It is also preferable that the fuel gas is hydrogen gas.

BEST MODE FOR CARRYING OUT THE INVENTION (First Embodiment)

Figure 1:
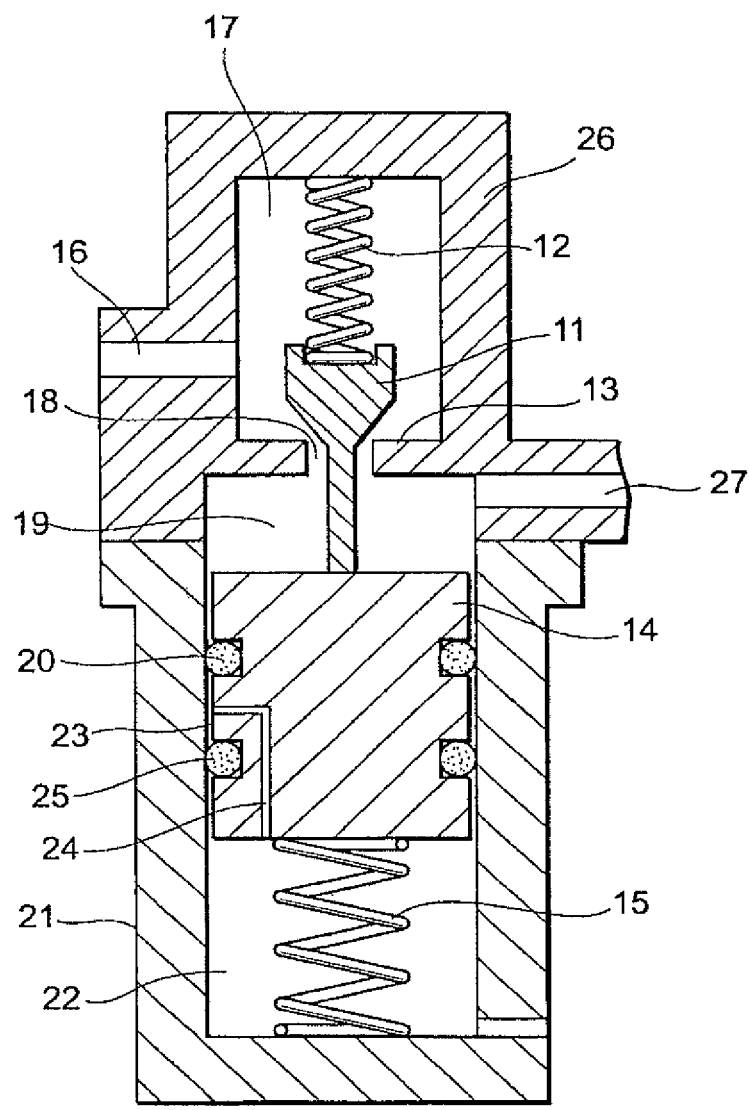
FIG. 1 is an illustration illustrating an outline of a first embodiment of the present invention.

The following is a description with reference to FIG. 1 of a first embodiment of a pressure regulating valve 10 of the present invention.

In FIG. 1, numeral 11 indicates a poppet valve, numeral 12 indicates a spring constituting urging means for the poppet valve, numeral 13 indicates a seat, numeral 14 indicates a piston, numeral 15 indicates a spring constituting piston urging means, numeral 16 indicates a high-pressure gas path (inlet path), numeral 17 indicates a primary chamber of the pressure regulating valve, numeral 18 indicates a path, numeral 19 indicates a secondary chamber of the pressure regulating valve, numeral 20 indicates a ring-type seal, numeral 21 indicates a cylinder (case), numeral 22 indicates a reference pressure chamber (reference pressure chamber), numeral 23 indicates a space, numeral 24 indicates a path, numeral 25 indicates a damper, numeral 26 indicates a pressure regulating valve case, and numeral 27 indicates a low pressure gas path (outlet path).

The inside of the pressure regulating valve can mainly be divided into the primary chamber 17, secondary chamber 19 and reference pressure chamber 22.

The spring 12, poppet valve 11, seat 13, piston 14 and spring 15 are arranged in series within the primary chamber 17, secondary chamber 19 and reference pressure chamber 22. The spring 12 presses the poppet valve 11 against the seat 13. The piston 14 is pushed up by the spring 15.

A groove is provided so as to go around the outer periphery of the piston 14, with a polymer material ring-type seal 20 being arranged within the groove. The seal 20 seals (covers) the gap between the piston 14 and the cylinder 21. The seal 20 is a material mainly composed of a polymer material such as resin etc. and, for example, a Teflon family seal may be used. Further, a groove is provided so as to go around the outer periphery of the piston 14, with a polymer material ring-type damper 25 being arranged within this groove. The damper 25 comes into contact with the inner wall of the cylinder 21. The damper 25 is a material, for example, primarily composed of rubber material.

The space 23, defined by the annular seal 20, annular damper 25, cylinder 21 and piston 14, and the reference pressure chamber 22, communicate via the path 24. By providing the path 24, the space 23 and the reference pressure chamber 22 (for example, a space communicating with the atmosphere) communicate, and it is possible to regulate the pressure of the space 23 at the time of piston movement. Further, the path 24 may also be utilized in checking a sealed state of the seal 20 during manufacture or when valve abnormalities are detected. The path 24 may also be omitted.

In this configuration, high-pressure gas (fluid) flows in to the primary chamber 17 via the high-pressure gas path 16 from an external gas supply source (not shown). The high-pressure gas flows in to the secondary chamber 19 via the path 18 between the poppet valve 11 and seat 13 and flows out to outside of the pressure regulating valve from the low pressure gas path 27. The piston 14 resists the urging force of the spring 15 and is pushed down by the gas pressure of the secondary chamber 19.

When the downstream flow of gas for the pressure regulating valve is consumed, the pressure of the secondary chamber 19 falls. As a result, the piston 14 rises due to the urging force of the spring 15 and the poppet valve 11 rises. The poppet valve 11 comes away from the seat 13, and gas from the primary chamber 17 flows into the secondary chamber 19. The pressure of the secondary chamber 19 then rises due to this inflow and the piston 14 is pushed down again. The poppet valve 11 is then seated on the seat 13 and the extent of the flow of gas is reduced.

The pressure regulating valve 10 repeats this operation and regulates the downstream flow gas pressure of the secondary chamber 19. With this regulation, the polymer material ring-type damper 25 is set to have a larger contact resistance with the inner wall of the cylinder 21 than the polymer material ring-type seal 20. The polymer material ring-type damper 25 is then capable of controlling rapid movements of the piston 14. Namely, the damper 25 has a function for attenuating moving energy of the piston 14 using frictional force during movement of the piston 14 and suppresses vibration and overshooting accompanying movement of the piston 14. As a result, it is possible to make gas pressure fluctuation on the downstream flow side (secondary side) of the pressure regulating valve 10 small.

Further, according to the embodiment of the present invention described above, by arranging seal materials of different resistance to sliding, it is possible to bring about both a damping action (attenuating action) and seal durability. Rubber seal material with a large resistance to sliding has a damping action (attenuating action) with respect to vibrations of a piston and hard resin seal material (Teflon family resins etc. described previously) with small resistance to sliding has high durability.

(Second Embodiment)

Figure 2:
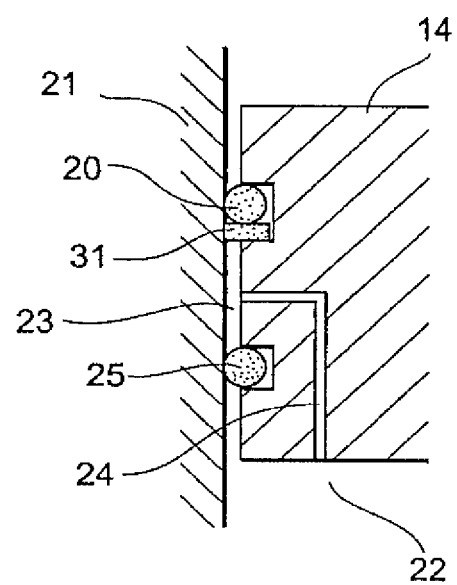
FIG. 2 is an illustration illustrating an outline of a second embodiment of the present invention.

FIG. 2 shows an outline of a second embodiment of the present invention. In FIG. 2, portions corresponding to portions of FIG. 1 are given the same numerals and are not described.

In this embodiment, an annular back-up ring 31 is overlaid on the polymer material ring-type seal 20. The reliability of the seal is increased as a result of providing the back-up ring 31.

(Third Embodiment)

Figure 3:
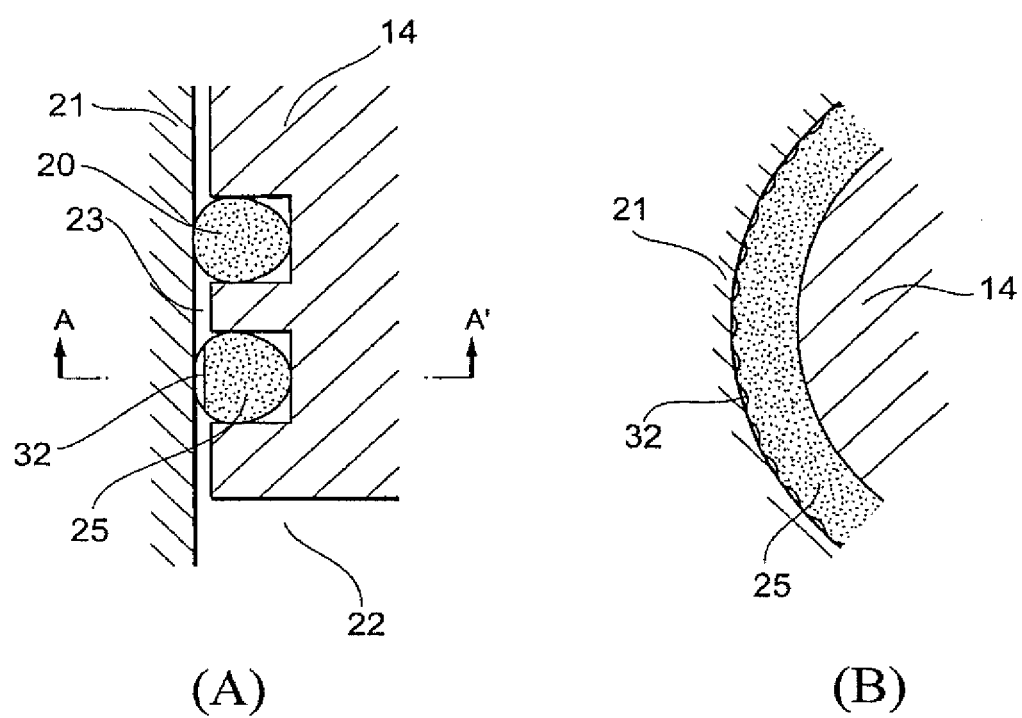
FIGS. 3 (A) and (B) are illustrations illustrating an outline of a third embodiment of the present invention.
Figure 4:
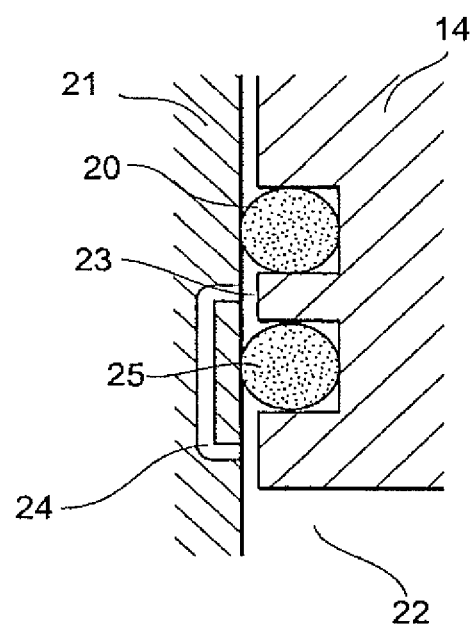
FIG. 4 is an illustration illustrating an outline of a fourth embodiment of the present invention.

FIG. 3 shows a third embodiment of the present invention. FIG. 3(A) shows an outline of an example of a further configuration for the polymer material ring-type damper 25 and FIG. 3(B) shows an example of a partial cut-away view from above taken along A-A' of FIG. 3(A). In FIG. 4, portions corresponding to portions of FIG. 1 are given the same numerals and are not described.

In this example, minute undulations 32 are formed at a contact surface for an inner wall surface of the cylinder 21 of the damper 25 in place of the path 24 of the piston 14 or alternatively, the surface is roughened so that gas can communicate between the space 23 and the reference pressure chamber 22.

(Fourth Embodiment)

FIG. 4 shows a fourth embodiment of the present invention. In FIG. 4, portions corresponding to portions of FIG. 1 are given the same numerals and these portions are not described.

This embodiment is different from the case of FIG. 1 in that the path 24 is formed at the side of the cylinder 21. It is preferable for the path 24 to be formed in such a manner that the path 24 and the seal 25 do not overlap when the piston 14 moves.

(Fifth Embodiment)

Figure 5:
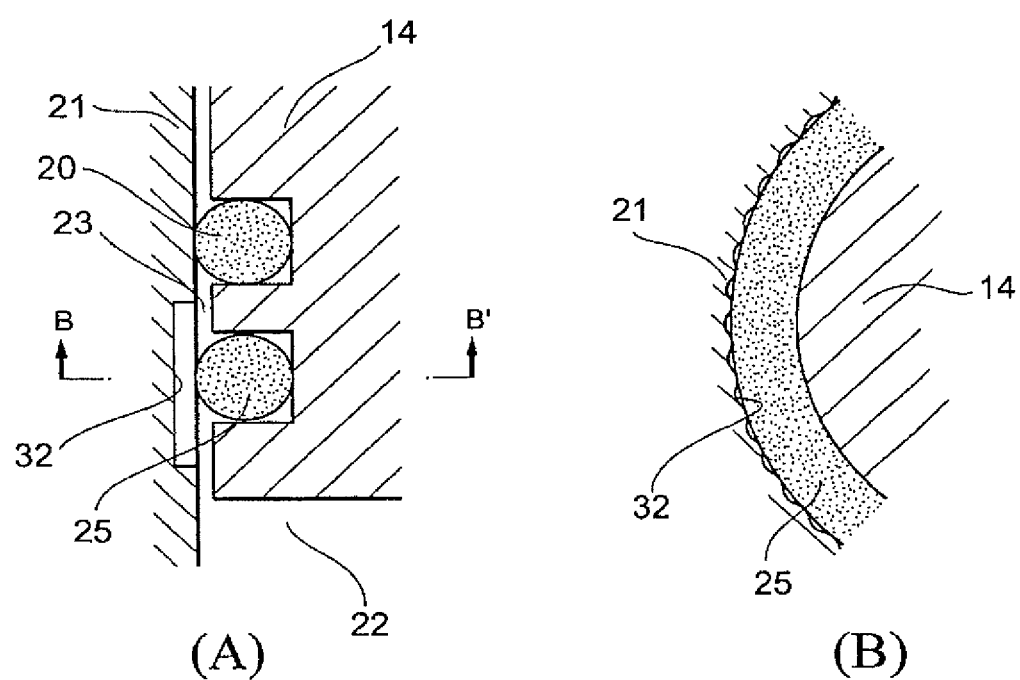
FIGS. 5 (A) and (B) are illustrations illustrating an outline of a fifth embodiment of the present invention.

FIG. 5 shows a fifth embodiment of the present invention. FIG. 5(A) shows an outline of an example of a further configuration for the portion of the ring-type damper 25 and FIG. 5(B) shows an example of a partial cut-away view from above taken along B-B' of FIG. 5(A). In FIG. 5, portions corresponding to portions of FIG. 1 are given the same numerals and are not described.

In this example, minute undulations 32 are formed at an inner wall surface of the cylinder 21 that the damper 25 makes contact with in place of the path 24 of the piston 14 or alternatively, the surface is roughened so that gas can communicate between the space 23 and the reference pressure chamber 22.

(Sixth Embodiment)

Figure 6:
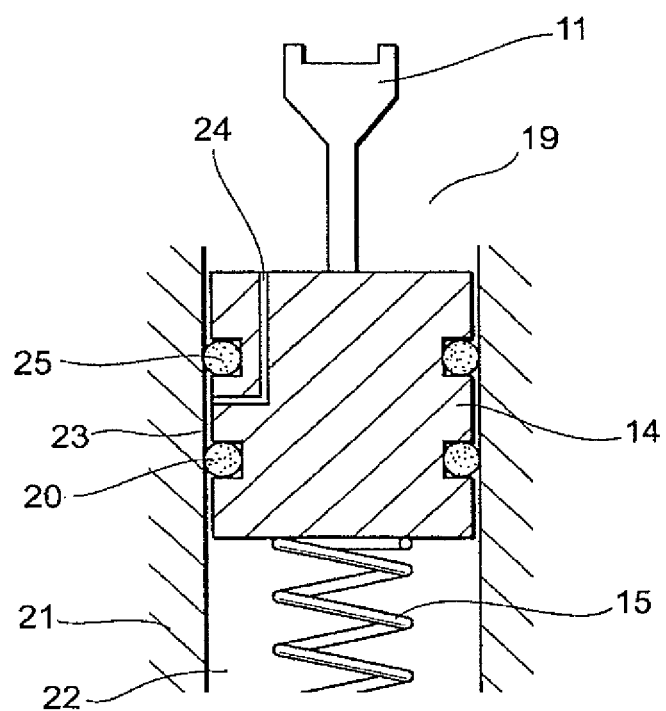
FIG. 6 is an illustration illustrating an outline of a sixth embodiment of the present invention.

FIG. 6 shows a sixth embodiment of the present invention. In FIG. 6, portions corresponding to portions of FIG. 1 are given the same numerals and are not described.

In this embodiment, the positions of the seal 20 and the damper 25 at the piston 14 are reversed with respect to those of the first embodiment. In correspondence with this, the path 24 causes the secondary chamber 19 and the space 23 between the seal 20 and damper 25 at the piston-side wall to communicate.

Seventh Embodiment

Figure 7:
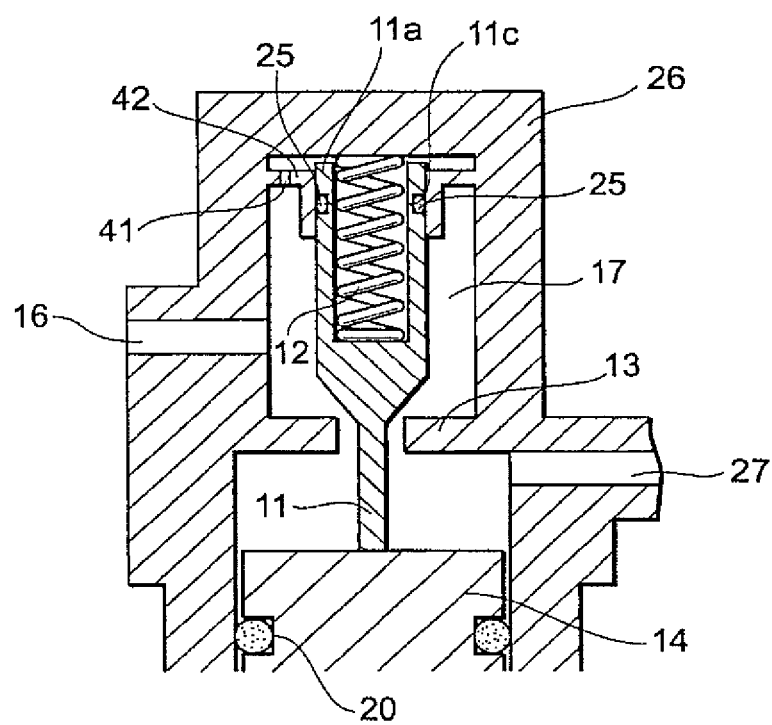
FIG. 7 is an illustration illustrating an outline of a seventh embodiment of the present invention.

FIG. 7 shows a seventh embodiment of the present invention. In FIG. 7, portions corresponding to portions of FIG. 1 are given the same numerals and are not described.

In this embodiment, the polymer material ring-type damper 25 is arranged within a groove 11c formed at a side part of region 11a on the side of the primary chamber 17 on the opposite side to the piston of the poppet valve 11. A path 41 for ventilation is provided at a guide 42 of the damper 25 provided at the primary chamber 17.

(Eighth Embodiment)

Figure 8:
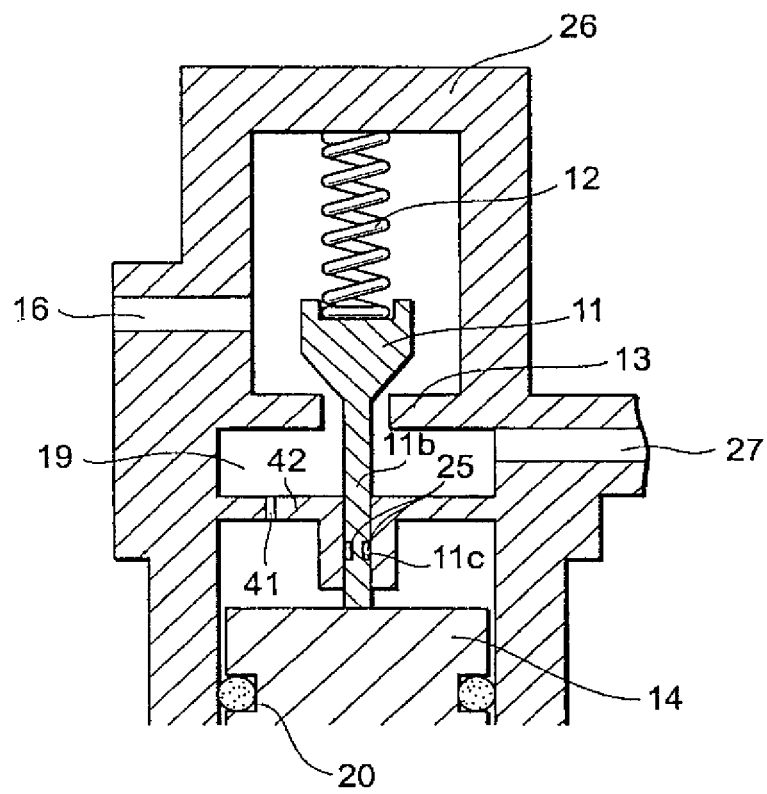
FIG. 8 is an illustration illustrating an outline of an eighth embodiment of the present invention.

FIG. 8 shows an eighth embodiment of the present invention. In FIG. 8, portions corresponding to portions of FIG. 1 are given the same numerals and are not described.

In this embodiment, the polymer material ring-type damper 25 is arranged within a groove 11c formed at a side part of a region 11b of the poppet valve 11 on the side of the secondary chamber 19. A path 41 for ventilation is provided at the guide 42 of the damper 25 provided at the secondary chamber 19.

(Ninth Embodiment)

Figure 9:
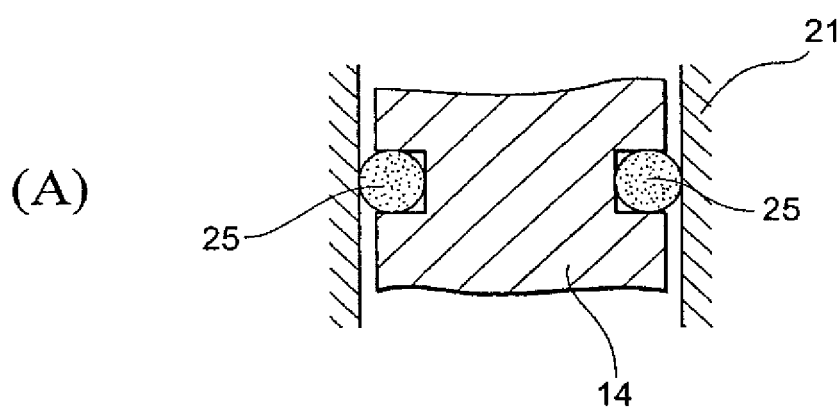
FIGS. 9 (A) and (B) are illustrations illustrating an outline of a ninth embodiment of the present invention.
Figure 9:
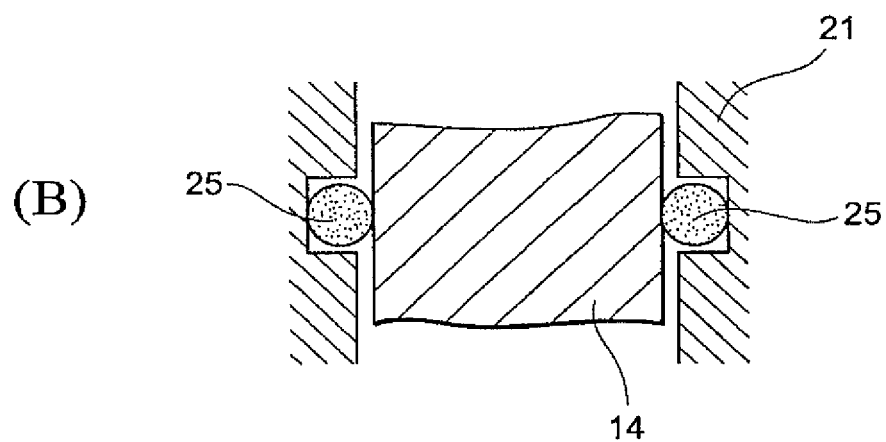

FIG. 9(A) and FIG. 9(B) show a ninth embodiment of the present invention. In FIG. 9, portions corresponding to portions of FIG. 1 are given the same numerals and are not described.

FIG. 9(A) shows an example where a polymer material ring-type seal and a polymer material ring-type damper are arranged at the side of a moving body (piston 14, poppet valve 11, etc.).

FIG. 9(B) shows an example where a polymer material ring-type seal and a polymer material ring-type damper are arranged at the side of a fixed body (cylinder 21, case 26, etc.). Any of these arrangements are desirable and can be selected appropriately according to the structure and characteristics of the pressure regulating valve.

(Tenth Embodiment)

Figure 10:
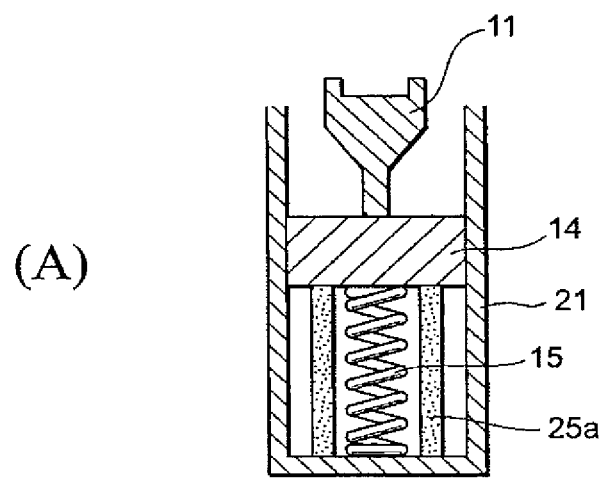
FIGS. 10 (A) and (B) are illustrations illustrating an outline of a tenth embodiment of the present invention.
Figure 10:
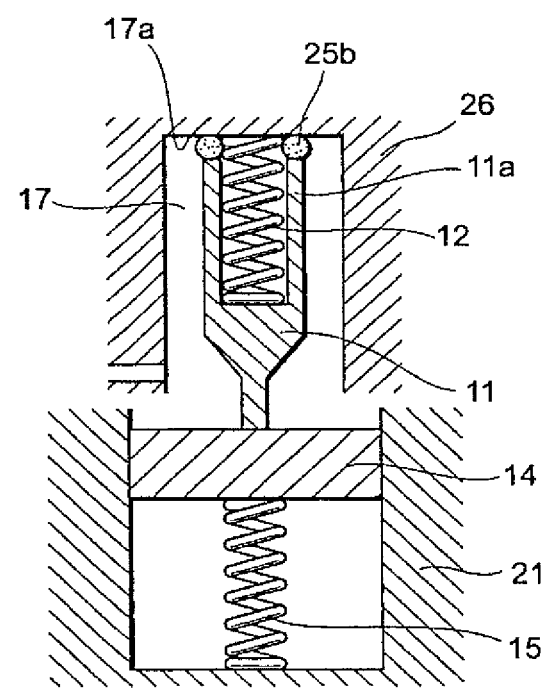

FIG. 10(A) and FIG. 10(B) show a tenth embodiment of the present invention. In FIG. 10, portions corresponding to portions of FIG. 1 are given the same numerals and are not described. Although not shown in the drawings, it is also possible to provide a polymer material ring-type seal at the side surface (outer periphery) of the piston 14.

In the embodiment shown in FIG. 10(A), a cylindrical damper 25a positioned with a spring inside is positioned between the bottom of the reference pressure chamber 22 and the piston 14. The damper 25a has a function for attenuating moving energy using resiliency (retractility) during movement of the piston 14 and suppresses vibration and overshooting of the poppet valve 11 accompanying movement of the piston 14.

In the embodiment shown in FIG. 10(B), a cylindrical damper 25b is arranged between a ceiling 17a of the primary chamber 17 and region 11a of the poppet valve 11. The damper 25b has a function for attenuating moving energy using resiliency (retractility) during movement of the poppet valve 11 (or piston 14) and suppresses vibration and overshooting accompanying movement of the poppet valve 11.

With the configuration of FIG. 10(A) and FIG. 10(B), the groove 11c is not formed at the side surface of the poppet valve 11 and the damper can therefore be arranged in a straightforward manner.

(Eleventh Embodiment)

Figure 11:
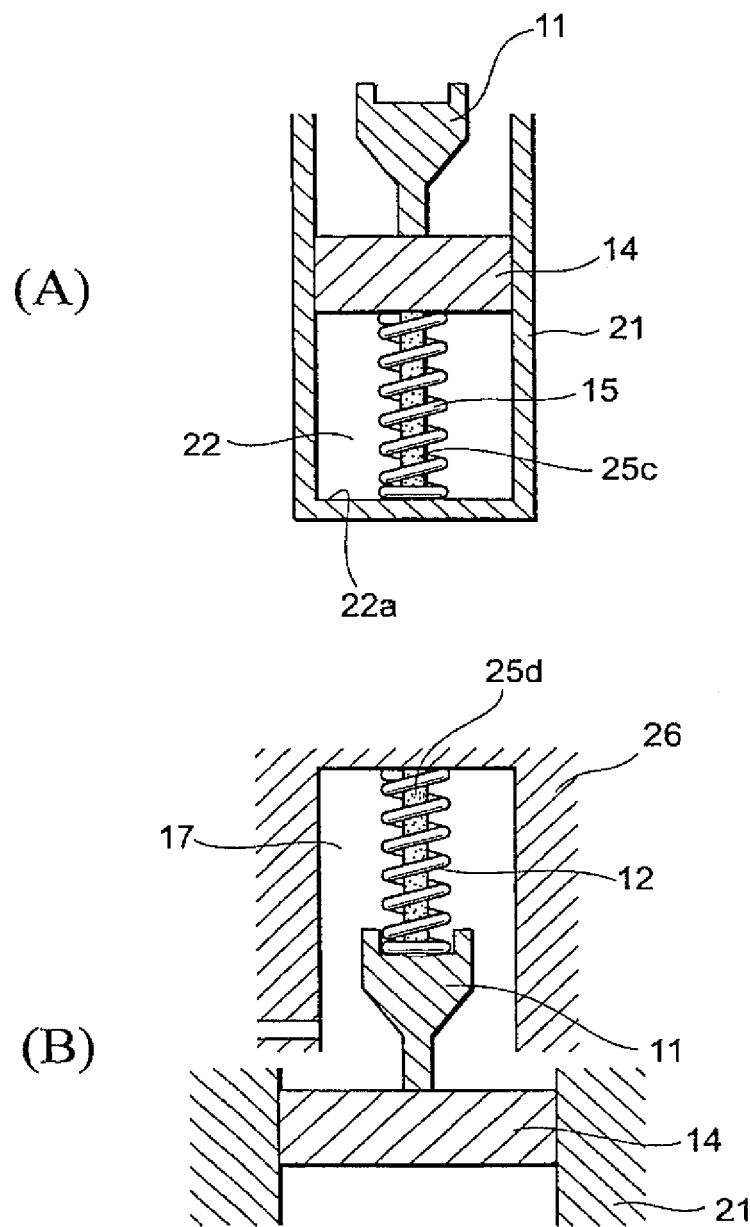
FIGS. 11 (A) and (B) are illustrations illustrating an outline of an eleventh embodiment of the present invention.

FIG. 11(A) and FIG. 11(B) show an eleventh embodiment of the present invention. In FIG. 11, portions corresponding to portions of FIG. 1 are given the same numerals and are not described. Although not shown in the drawings, it is also possible to provide a polymer material ring-type seal at the side surface (outer periphery) of the piston 14.

In the embodiment shown in FIG. 11(A), a columnar damper 25c positioned at the axial center of the spring 15 is arranged between a bottom 22a of the reference pressure chamber 22 and the piston 14. The damper 25c has a function for attenuating moving energy using resiliency (retractility) during movement of the piston 14 and suppresses vibration and overshooting of the poppet valve 11 accompanying movement of the piston 14.

In the embodiment shown in FIG. 11(B), a columnar damper 25d positioned at the axial center of the spring 12 is arranged between a ceiling of the primary chamber 17 and the poppet valve 11. The damper 25d has a function for attenuating moving energy using resiliency (retractility) during movement of the poppet valve 11 and suppresses vibration and overshooting of the poppet valve 11 accompanying movement of the piston 14.

With the configuration of FIG. 11(A) and FIG. 11(B) also, the groove 11c is not formed in the side surface of the poppet valve 11. The damper can therefore be arranged in a straightforward manner and the structure is simple because the damper is columnar in shape.

(Twelfth Embodiment)

Figure 12:
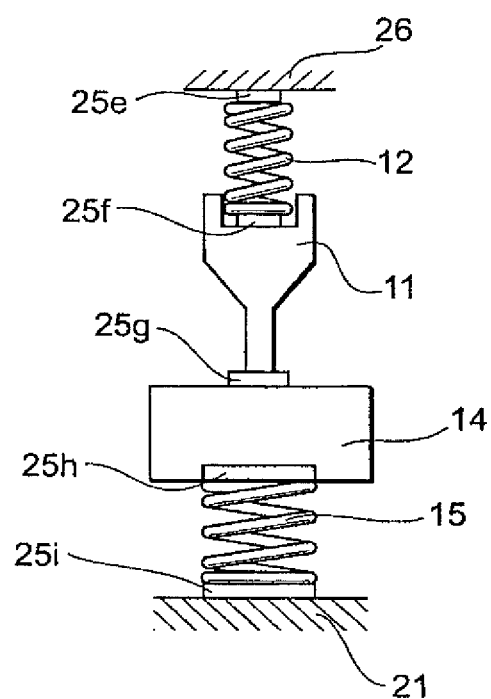
FIG. 12 is an illustration illustrating an outline of a twelfth embodiment of the present invention.

FIG. 12 shows an outline of the essential parts of a twelfth embodiment of the present invention. In FIG. 12, portions corresponding to portions of FIG. 1 are given the same numerals and are not described. Although omitted from the drawings, reference pressure chamber 22 and pressure regulating valve case 26 are the same configuration as for FIG. 1.

In the embodiment shown in FIG. 12, possible arrangements for dampers 25e to 25i that are sheet-shaped resilient bodies at the side of a moving body of a pressure regulating valve are shown. Namely, positioning at one or a plurality of between the pressure regulating valve case 26 and spring 12, between the spring 12 and the poppet valve 11, between the poppet valve 11 and the piston 14, between the piston 14 and the spring 15, between the spring 15 and a bottom 25 of the cylinder 21 is possible. Each damper then suppresses vibrations and overshooting of the poppet valve 11 (or piston 14).

(Thirteenth Embodiment)

Figure 13:
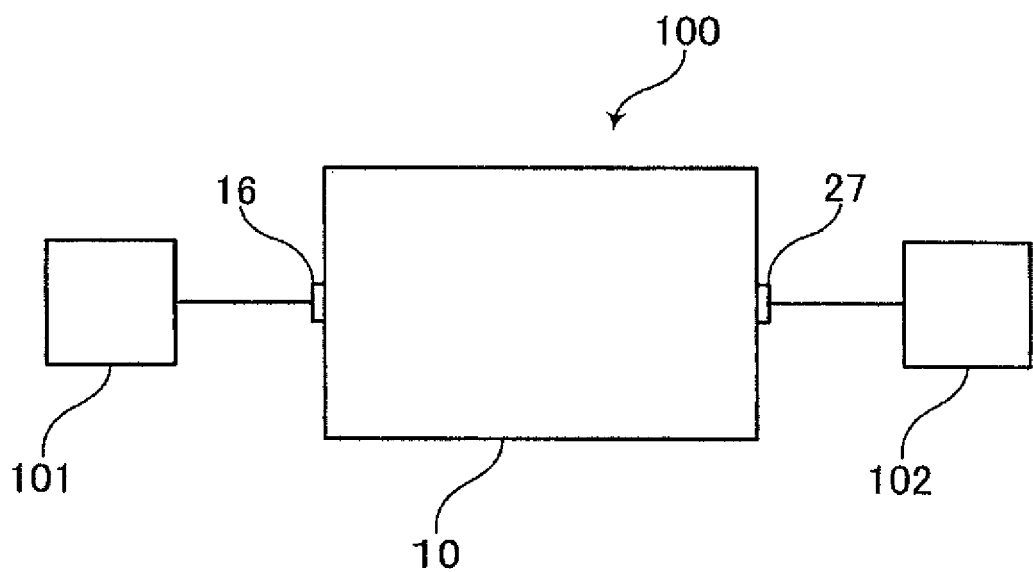
FIG. 13 is a diagram showing the constitution of a preferable embodiment of the fuel gas supply system according to the present invention.

FIG. 13 is a diagram showing the constitution of a preferable embodiment of the fuel gas supply system according to the present invention. A fuel gas supply system 100 is equipped with a fuel gas source 101 (a fuel gas supply source) connected to the high-pressure gas path 16 of the pressure regulating valve 10 and a fuel gas container member 102 connected to a low pressure gas path 27 of the pressure regulating valve 10. Accordingly, the fuel gas source 101 is connected to the primary chamber 17 of the pressure regulating valve 10, and the fuel gas container member 102 is connected to the secondary chamber 19 of the pressure regulating valve 10.

The specific example of the fuel gas source 101 includes a fuel gas generator such as hydrogen gas, a gas container such as a gas cylinder, a tank or the like in which a fuel gas e.g. hydrogen gas, etc. is accommodated. Further, the specific example of the fuel gas container member 102 includes a gas container such as a gas cylinder, a tank or the like to store a fuel gas for example hydrogen gas, a fuel cell (a fuel gas consuming member) consuming a fuel gas such as hydrogen gas or the like.

According to the fuel gas supply system 100 having such a constitution, as a fuel gas is supplied to the fuel gas container member 102 via the pressure regulating valve 10 from the fuel gas source 101, the fluctuation in flow of the fuel gas being supplied to the fuel gas container member 102.

Note that the present inventions are not limited to the embodiments described above, but rather various modifications are possible provided that the purport of the present invention is not deviated from.

For example, in the embodiments described above, the polymer material ring-type seal 20 and the polymer material ring-type damper 25 are arranged at prescribed distances along the axial direction of the piston 14 at the space between a side surface of the piston 14 and the inner wall surface of the cylinder (case) 21 but the configuration is by no means limited in this respect. The seal 20 may be selected appropriately according to the type of fluid (gas, liquid) constituting the target of pressure regulation. In particular, when the fluid is a hydrogenous gas, it is preferable to select a material that is impermeable to hydrogen. The seals and dampers may be located at a plurality of locations and may all be the same shape or may all be different shapes.

The damper 25 may also be provided with a seal function. In this event, it is preferable to arrange two seals where the material and characteristics (for example, sliding resistance) are different.

It is also possible to omit the paths 24 and 41 provided at at least one of the valve moving member (piston, poppet) or the valve case (cylinder). Moreover, the fuel gas supply system of the present invention can also have no fuel gas container member.

It is further possible to combine each of the aforementioned embodiments in an appropriate manner.

Further, the pressure regulating valve of the present invention is suited to reducing pressure of high-pressure gas (gas) and is particularly suited to use as a pressure regulating valve for hydrogenous gas used in fuel cells etc.

The invention claimed is:

1. A pressure regulating valve, comprising:
   a case that includes a primary chamber and a secondary chamber;
   a valve moving member that includes a piston and a valve element, wherein:
     the valve moving member moves in such a manner as to cause communication or block communication between the primary chamber and the secondary chamber within the case, and
     one end of the piston faces the secondary chamber and the other end faces a reference pressure chamber;
   a plurality of seal members arranged between said case and said valve moving member, wherein:
     said plurality of seal members are made of different materials, and
     said plurality of seal members are arranged between a side surface of said piston and an inner wall case; and
   communicating means for causing a space and said reference pressure chamber to communicate, wherein:
     the space is defined by said side surface of said piston, said inner wall of said case and said plurality of seal members,
     the communicating means is formed in a body of the case, and
     the communicating means is configured to connect the space and the reference pressure chamber such that a pressure of the space is regulated when the piston moves,
   wherein the communicating means is formed at an inner wall surface of the body of the case at a location of a first seal member of the plurality of seal members on a side of said reference pressure chamber, and the communicating means is formed by undulations so that gas can communicate between the s ace and the reference pressure chamber.

2. The pressure regulating valve according to claim 1, wherein materials for said plurality of seal members have different resistances to sliding.

3. The pressure regulating valve according to claim 1, wherein said plurality of seal members includes a ring-type seal at least provided between the side surface of said piston and the inner wall of said case and a ring-type damper that is configured to attenuate an extent of movement of said valve moving member.

4. The pressure regulating valve according to claim 1, wherein a second seal member of the plurality of seal members positioned at a side of the secondary chamber has a lower resistance to sliding than the first seal member of the plurality of seal members on the side of said reference pressure chamber.

5. The pressure regulating valve according to claim 1, wherein a second seal member of the plurality of seal members positioned at a side of the secondary chamber seals fluid to a greater extent than the first seal member of the plurality of seal members on the side of said reference pressure chamber.

6. The pressure regulating valve according to claim 1, wherein the first seal member of the plurality of seal members positioned on the side of said reference pressure chamber is configured to attenuate a moving force of said valve moving member to a greater extent than a second seal member of the plurality of seal members on a side of said secondary chamber.

7. The pressure regulating valve according to claim 1, wherein said plurality of seal members is constituted by at least two ring-type seals for sealing fluid, with one ring-type seal having a relatively higher resistance to sliding than the other ring-type seal.

8. The pressure regulating valve according to claim 1, wherein one of said plurality of seal members is a ring-type damper that is configured to attenuate an extent of movement of said valve moving member, with the ring-type damper being located at least one of between said inner wall of said case and said valve element and between said inner wall of said case and said piston.

9. The pressure regulating valve according to claim 3, wherein said valve moving member is arranged with first and second urging means on either side within said case, with said ring-type damper being located at least one of between said case and said first urging means, between said first urging means and said valve element, between said valve element and said piston, between said piston and said second urging means, and between said second urging means and said case.

10. The pressure regulating valve according to claim 1, utilized in high-pressure gas pressure regulation.

11. The pressure regulating valve according to claim 1, utilized in pressure regulation of fuel gas.

12. A fuel gas supply system comprising a fuel gas supply source and the pressure regulating valve according to claim 1.

13. The fuel gas supply system according to claim 12 comprising a fuel gas container or a fuel gas consuming member, which is connected to said secondary chamber of said pressure regulating valve.

14. The fuel gas supply system according to claim 12, wherein said fuel gas is hydrogen gas.

* * * * *